United States Patent Office 2,760,952
Patented Aug. 28, 1956

2,760,952

PREPARATION OF POLYMERIZATION PRODUCTS FROM 2-HYDROXYMETHYL-BUTENE-1-ONE-(3) ETHERS

Walter Grimme, Utfort-Moers, and Johannes Wöllner, Moers, Germany, assignors to Rheinpreussen Aktiengesellschaft fuer Bergbau und Chemie, Homberg (Lower Rhine), Germany, a corporation of Germany No Drawing. Application April 11, 1955,
Serial No. 500,699

18 Claims. (Cl. 260—63)

This invention relates to improvements in the preparation of polymerization products 2-hydroxymethyl-butene-1-one-(3).

It is known that 2-hydroxymethyl-butene-1-one-(3) may be polymerized with the formation of transparent polymerization products. The properties of these polymerization products are, however, not satisfactory to enable their commercial use as synthetic resins, particularly in view of their brittleness and complete insolubility in practically all organic solvents.

One object of this invention is the production of commercially valuable polymerization products from 2-hydroxymethyl-butene-1-one-(3). This, and still further objects, will become apparent from the following description:

In accordance with the invention it has been found that if 2-hydroxymethyl-butene-1-one-(3) is etherified with methyl or ethyl alcohol, the resulting ether will on polymerization yield valuable transparent plastics which are soluble in most organic solvents.

The etherification of the 2-hydroxymethyl-butene-1-one-(3) may be very simply effected with the addition of an excess of the alcohol in the presence of a strong acid at an elevated temperature. It was completely unexpected that the ketol would form the ether in this simple manner, particularly in view of its conjugated, unsaturated system.

The etherification of the 2-hydroxymethyl-butene-1-one-(3) may be effected using an excess of 2–6 mols of the methanol or ethanol, and preferably methanol per mol of the hydroxymethyl-butenone. The esterification reaction is catalytically accelerated by the addition of a small quantity of a strong acid. Examples of the strong acid which may be used include inorganic acids such as sulfuric acid, hydrochloric acid, or phosphoric acid and aryl sulfonic acids, such as benzene sulfonic acid or p-toluene sulfonic acid. An addition of about 0.1 to 2% of these acids, referred to the quantity of hydroxymethylbutenone used is sufficient. The use of a greater amount of these strong acids is not advisable, since in such cases there is danger of decomposition and decoloration.

The etherification may be carried out at any temperature above 20° C. up to the boiling point of the reaction mixture. After the completion of the reaction, the reaction mixture is neutralized by the addition of alkali metal hydroxides, such as sodium hydroxide or potassium hydroxide or alkali metal carbonates such as sodium carbonate, potassium carbonate, sodium bicarbonate, potassium bicarbonate, or ammonia, or ammonium carbonate. After the neutralization the neutralized product is subjected to vacuum distillation, in connection with which the excess aliphatic alcohol and water first pass over and thereupon the hydroxymethylbutenone ether is obtained in the form of a colorless liquid.

The ether obtained in this manner is thereupon subjected to polymerization. The polymerization will spontaneously proceed when the ethers are merely allowed to stand at ordinary temperature. The polymerization may be accelerated by heating and by the addition of polymerization accelerators and by the use of actinic light. The polymerization may be effected at a temperature range between 10 and 100° C. While elevated temperatures of 30–100° C. will accelerate the polymerization process, it has been found advantageous in order to obtain particularly clear polymers to keep the temperature as low as possible. Temperatures of between 15 and 25° C. have proven particularly suitable for this purpose.

The polymerization will furthermore be speeded up by effecting the same in the presence of the conventionally known polymerization accelerators. In general, it is sufficient to add about 0.1–1% of the polymerization accelerator, based on the total weight of the ether used. As polymerization accelerators, there are suitable, for example, organic peroxides, such as benzoylperoxide, tertiary butylperoxide, tertiary butylhydroperoxide, lauroylperoxide, acetylperoxide, ethylperoxide, acetylbenzoylperoxide, urea peroxide or oleic acid peroxide, hydrogen peroxide by itself or in combination with organic per acids such as performic acid or peracetic acid or in combination with organic acid anhydrides, such as acetic anhydride or propionic anhydride. Instead of the said combinations of hydrogen peroxide and an organic per acid or an organic acid anhydride, there can also be used an inorganic perborate such as sodium, potassium or lithium perborate, in combination with an organic acid anhydride, such as acetic anhydride.

Furthermore, there can be used as polymerization accelerators, inorganic peroxides, such as sodium, potassium, lithium or barium peroxide; inorganic per salts, such as alkali metal perborates; per sulfates, such as alkali metal or ammonium persulfates; organic acid anhydrides, such as sulfur dioxide or boric anhydride; halogen compounds such as aluminium chloride, tin tetrachloride, anhydrous hydrofluoric acid, boron fluoride or its diether compounds or phosphorus oxychloride, as well as colloidal metal oxides, metal carbonyls, and siccatives, such as manganese oleate and manganese resonate. The polymerization can furthermore be accelerated by the action of actinic light such as sunlight or ultraviolet light.

The polymerization is advisedly carried out at ordinary pressure. The use of elevated pressures does not offer any particular advantage. It is advisable to carry out the polymerization with the exclusion of atmospheric oxygen, since when atmospheric oxygen is present, a yellowing of the polymers can occur. Accordingly, it is preferable to operate in the presence of an inert gas such as nitrogen or carbon dioxide.

The plastics obtained in accordance with the invention are characterized by great clarity (transparency) and hardness, by great elasticity and good dissolving power in many solvents. Due to their strength and transparency, the polymers can be used on the one hand as plastics or artificial glass, while, due to their good solubility in organic solvents, they can also be used as synthetic resins in the varnish industry.

The polymerization products obtained in accordance with the invention are insoluble in aliphatic hydrocarbons, but soluble in acetates such as ethylacetate, propylacetate, or butylacetate; in ketones such as acetone, methylethylketone, diethylketone, methylpropylketone, dipropylketone; in aromatic hydrocarbons such as benzene, toluene, xylene, as well as in derivates of glycol, such as glycol ether or glycol monoacetate and glycol diacetate.

The following examples are given by way of illustration and not limitation:

*Example 1*

200 grams 2-hydroxymethyl-butene-1-one-(3) are mixed with 260 grams methanol and 0.6 grams concentrated sulfuric acid. This mixture is boiled under a reflux condensor for 15 hours. The reaction mixture is thereupon neutralized with dilute caustic soda solution and distilled in a vacuum. At an absolute pressure of 12 mm. mercury, there is obtained, after first runnings consisting of methyl alcohol and water, the methyl ether of 2-hydroxymethyl-butene-1-one-(3) between 51 and 52° C. in the form of a very mobile colorless liquid. The methyl ether has a specific gravity of 0.959 at 15° C. The boiling point of the methyl ether is 152° C. at 760 mm. mercury.

*Example 2*

To 200 grams 2-hydroxymethyl-butene-1-one-(3) there are added 260 grams ethyl alcohol and 1.2 grams p-toluene sulfonic acid. Upon boiling under a reflux condensor, the temperature of the mixture rises to 84.5° C. After heating for 15 hours, the reaction mixture is cooled and neutralized by the addition of sodium carbonate solution. Upon the vacuum distillation which is then effected, the ethyl ether is obtained as a fraction having a boiling point of 54–55° C. at an absolute pressure of 12 mm. mercury. The density of the ethyl ether is 0.929 at 15° C.

*Example 3*

200 grams 2-hydroxymethyl-butene-1-one-(3) methyl ether are held at a temperature of 30° C. for four days under nitrogen. There is obtained a transparent resin which is soluble in many solvents, such as ethyl acetate, propyl acetate, butyl acetate, acetone, methylethylketone, benzene and tolune, as well as in glycol ethers and glycol acetates.

*Example 4*

To 150 grams 2-hydroxymethyl-butene-1-one-(3) methyl ether, there are added 0.7 gram tertiary butylhydroperoxide, whereupon the mixture is polymerized at 25° C. in a nitrogen atmosphere. There is obtained a water-clear resin which has similar solubility properties to the polymerization products obtained in accordance with Example 3.

We claim:

1. A polymer of an ether of 2-hydroxymethyl-butene-1-one-(3), selected from the group consisting of the ethyl and methyl ether.

2. An organic solvent soluble transparent, plastic polymer of an ether of 2-hydroxymethyl-butene-1-one-(3), selected from the group consisting of the ethyl and methyl ether.

3. A polymer of 2-hydroxymethyl-butene-1-one-(3) methyl ether.

4. A polymer of 2-hydroxymethyl-butene-1-one-(3) ethyl ether.

5. As a new chemical compound, an ether of 2-hydroxymethyl-butene-1-one-(3) selected from the group consisting of the ethyl and methyl ether.

6. As a new chemical compound, 2-hydroxymethyl-butene-1-one-(3) methyl ether.

7. As a new chemical compound, 2-hydroxymethyl-butene-1-one-(3) ethyl ether.

8. Process for the etherization of 2-hydroxymethyl-butene-1-one-(3), which comprises contacting 2-hydroxymethyl-butene-1-one-(3) with a $2x$–$6x$ molar excess of an aliphatic alcohol, selected from the group consisting of methanol and ethanol in the presence of a strong acid at an elevated temperature, and recovering the ether formed.

9. Process according to claim 8, in which said contacting is effected at a temperature ranging from about 20° C. to the boiling point of the reaction mixture.

10. Process according to claim 8, in which said strong acid is present in amount of 0.1–2% referred to the 2-hydroxymethyl-butene-1-one-(3) present.

11. Process according to claim 10, in which said strong acid is a member selected from the group consisting of sulfuric acid, hydrochloric acid, phosphoric acid, benzene sulfonic acid, and p-toluene sulfonic acid.

12. Process for the production of polymers, which comprises contacting 2-hydroxymethyl-butene-1-one-(3) with a $2x$–$6x$ molar excess of an aliphatic alcohol, selected from the group consisting of methanol and ethanol in the presence of a strong acid at elevated temperature, thereafter polymerizing the ether formed and recovering the resulting polymer.

13. Process according to claim 12, in which said contacting is effected at a temperature ranging from about 20° C. to the boiling temperature of the reaction mixture.

14. Process according to claim 12, in which said strong acid is a member selected from the group consisting of sulfuric acid, hydrochloric acid, phosphoric acid, benzene sulfonic acid, and p-toluene sulfonic acid.

15. Process according to claim 14, in which said strong acid is present in amount of 0.1–2%, based on the 2-hydroxymethyl-butene-1-one-(3) present.

16. Process according to claim 12, in which said polymerization is effected by allowing the ether to stand at a temperature of about 15–25° C.

17. Process according to claim 12, in which said polymerization is effected under an atmosphere of inert gas.

18. Process according to claim 12, in which said polymerization is effected in the presence of about 0.1–1% of a polymerization accelerator.

References Cited in the file of this patent

Morgen et al.: Chemistry and Industry, Sept. 24, 1938, pages 885–887, 891.

Peterson: Liebig Annalen d. Chemie, vol. 562, 1949, pages 205 and 207.